R. K. LE BLOND & W. F. GROENE.
VARIABLE SPEED MECHANISM.
APPLICATION FILED APR. 12, 1913.
1,170,830.
Patented Feb. 8, 1916.
5 SHEETS—SHEET 1.
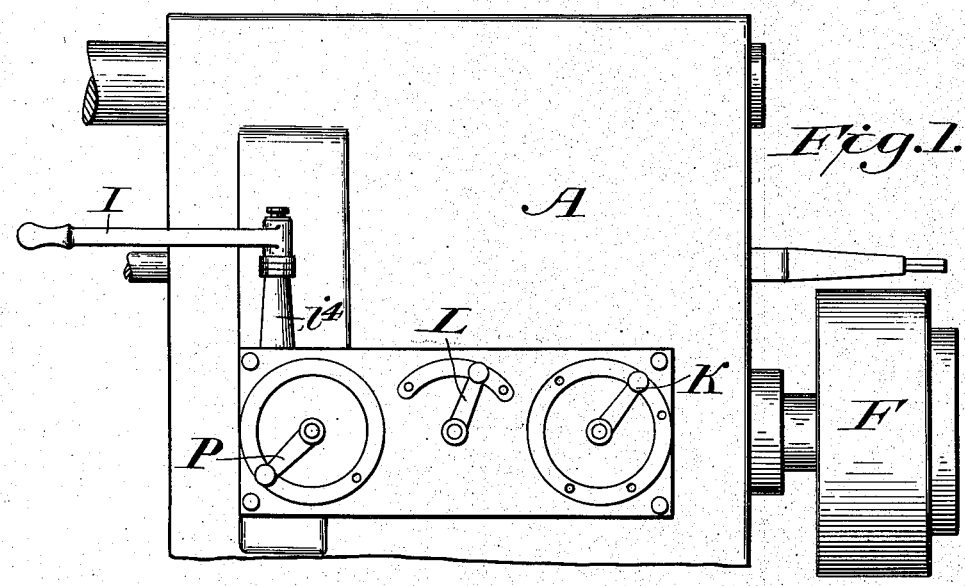
Fig. 1.
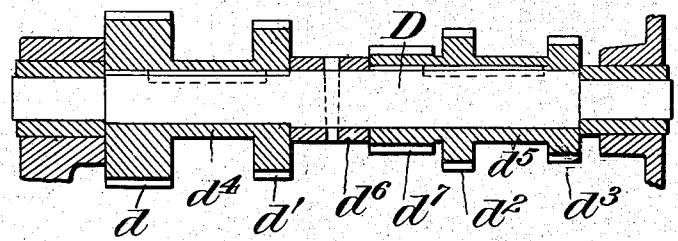
Fig. II.
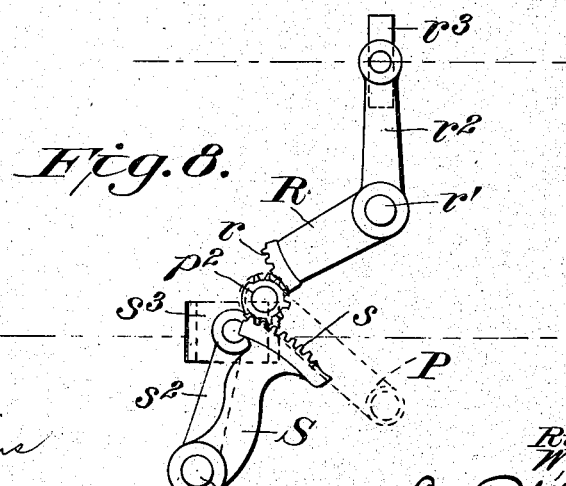
Fig. 8.
WITNESSES
INVENTORS
Richard K. LeBlond,
William F. Groene.
By Robt. P. Hains
Attorney

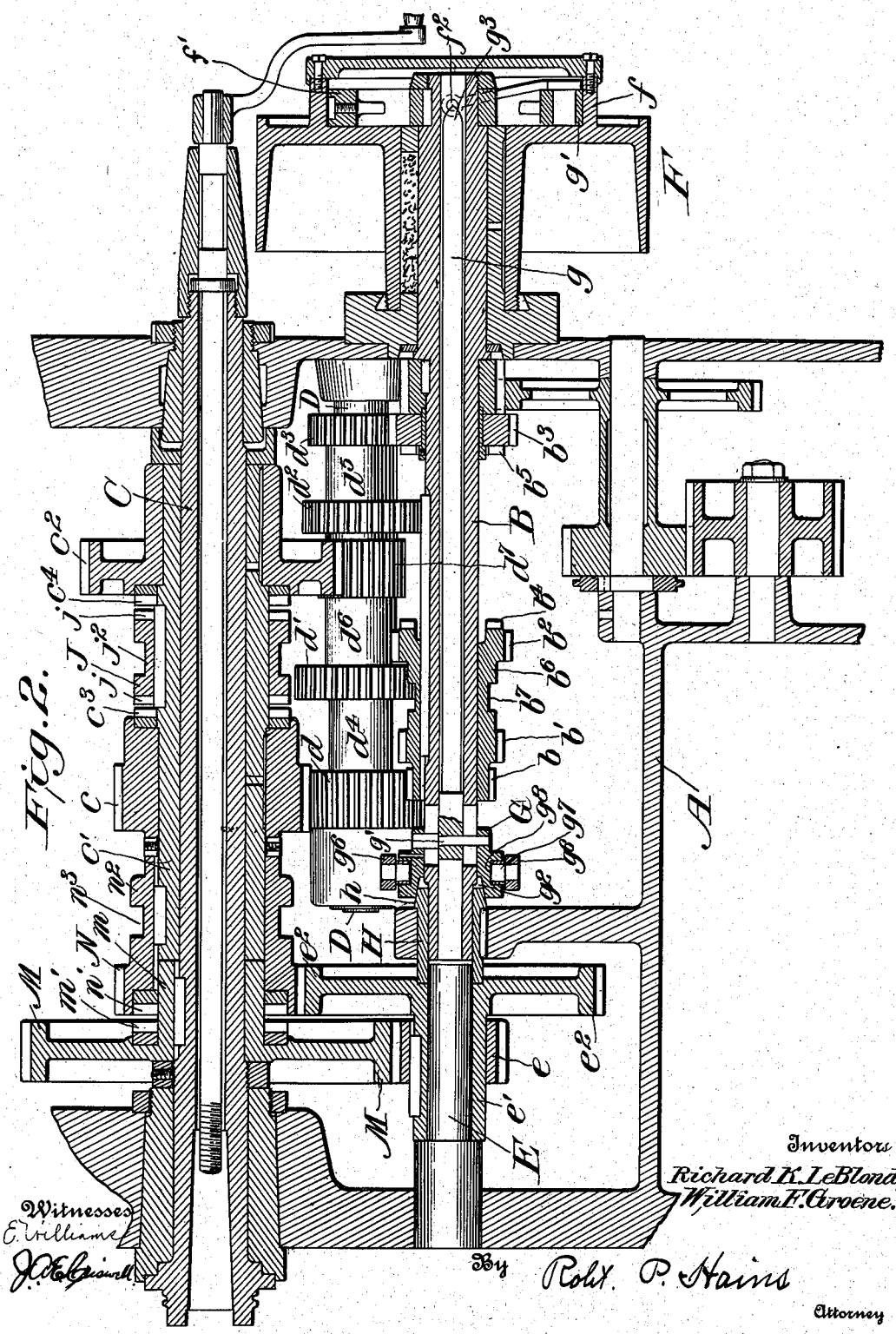

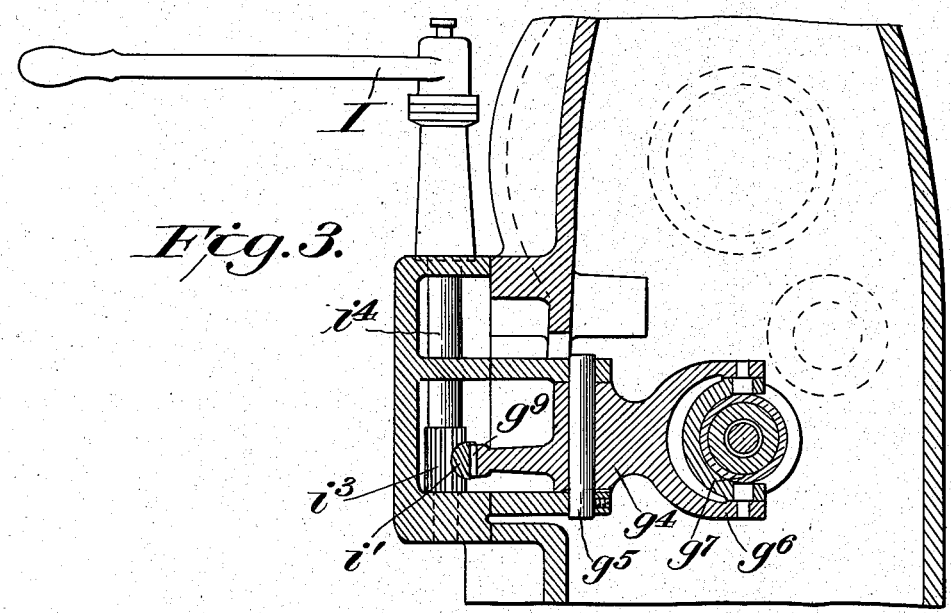

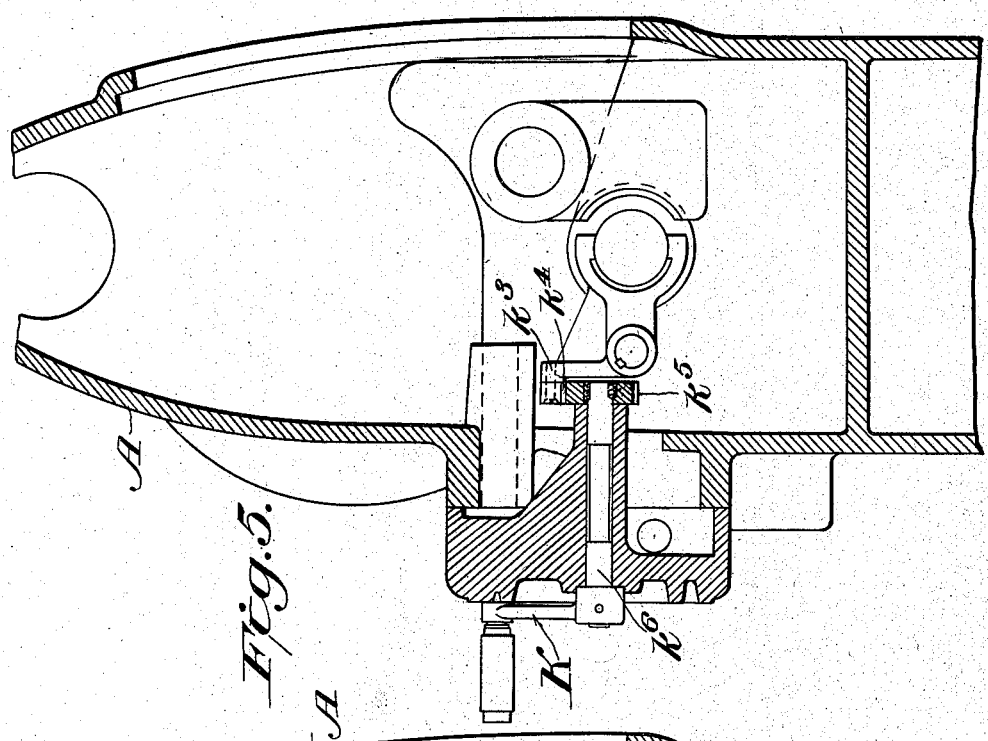
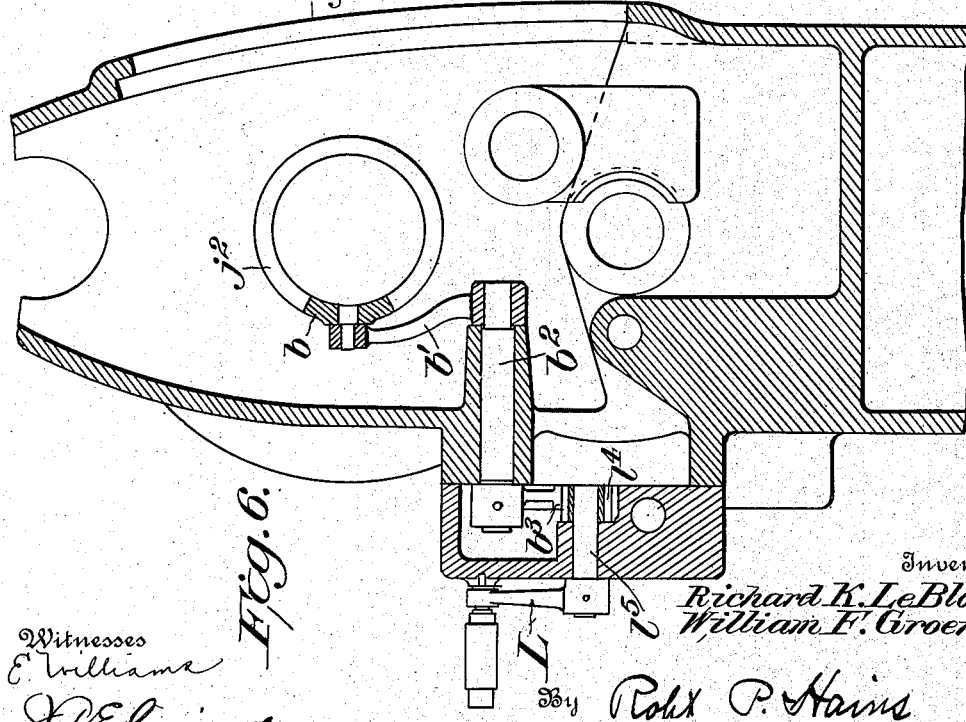

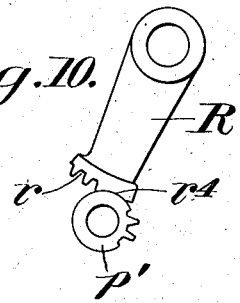
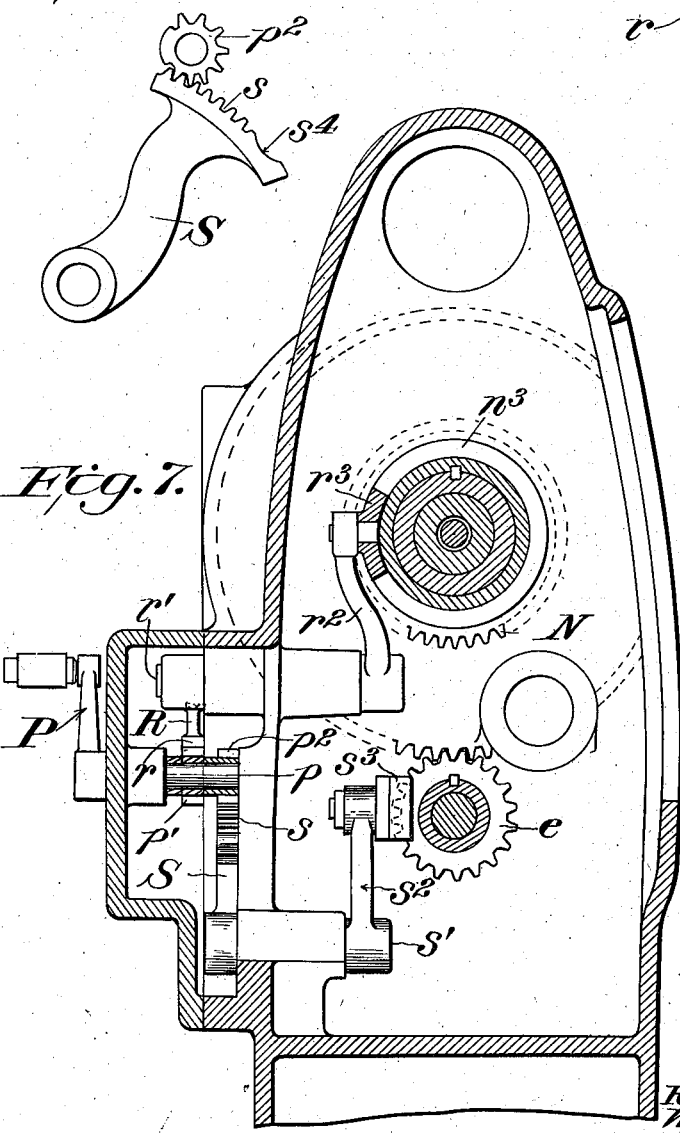
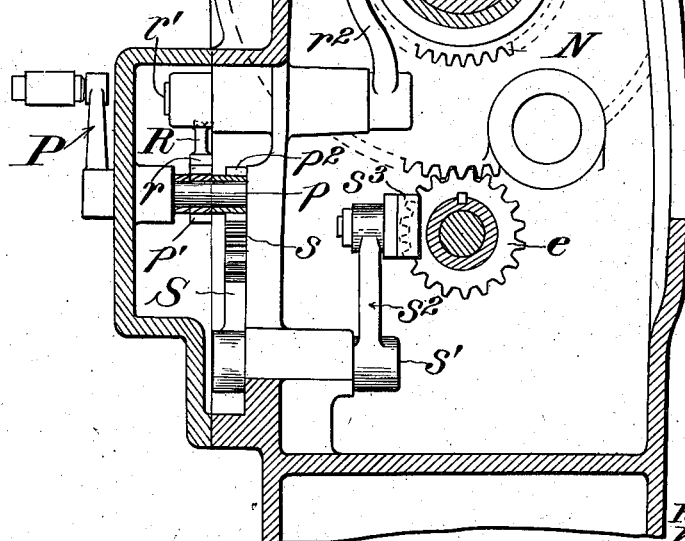

UNITED STATES PATENT OFFICE.

RICHARD K. LE BLOND AND WILLIAM F. GROENE, OF CINCINNATI, OHIO, ASSIGNORS TO THE R. K. LE BLOND MACHINE TOOL COMPANY, OF CINCINNATI, OHIO, A CORPORATION OF OHIO.

VARIABLE-SPEED MECHANISM.

1,170,830.   Specification of Letters Patent.   Patented Feb. 8, 1916.

Application filed April 12, 1913.  Serial No. 760,671.

*To all whom it may concern:*

Be it known that we, RICHARD K. LE BLOND and WILLIAM F. GROENE, citizens of the United States, residing at Cincinnati, county of Hamilton, and State of Ohio, have invented certain new and useful Improvements in Variable-Speed Mechanism, of which the following is a full, clear, and exact specification.

This invention relates to variable speed mechanism, especially designed for milling machines, and has for its object to provide a simple and compact system of gearing capable of giving a spindle many changes of speed, which, in the present case may be sixteen or more.

Special objects are to simplify the construction and manner of operating the mechanism for changing from the "open" drives to the "back gear" drives, and to position the back gear shaft and its gears so that they will require very little enlargement of the casing to include them, as well as allow for an extremely simple but efficient device being employed for making the change mentioned.

The invention will be first described in connection with the accompanying drawings, which constitute a part of this specification, and then set forth with more particularity in the claims at the end of the description.

In the accompanying drawings, in which similar reference characters are used to indicate the same parts in all the views: Figure 1 is a front elevation of the casing for a variable speed mechanism constructed in accordance with this invention; Fig. 2 is a longitudinal vertical section through the driving shaft, back gear shaft and spindle, the intermediate shaft being shown in elevation; Fig. 3 is a detail vertical cross section showing the means for operating the spool which controls the friction clutch for locking the driving pulley to the driving shaft, or for releasing said clutch and locking said driving shaft against turning; Fig. 4 is a detail horizontal section further illustrating the shifting means just mentioned, and also showing the means for shifting the cluster gears on the driving shaft; Fig. 5 is a detail vertical cross section further illustrating said means for shifting the cluster gears; Fig. 6 is a detail vertical cross section showing the means for shifting the double spool on the spindle; Fig. 7 is a detail vertical cross section illustrating the means for changing from the "open" drives to the "back gear" drives; Fig. 8 is a diagrammatic front elevation of the interrupted gears and segments in the positions they occupy when the drive is through the back gears; Figs. 9 and 10 are enlarged detached views of the two interrupted gears and their interrupted segments, the relative positions of the segments to the gears being the same as in Figs. 7 and 8, and Fig. 11 is a longitudinal section through the gear-carrying sleeves on the intermediate shaft.

Suitably journaled in the casing A are the driving shaft B, spindle C, intermediate shaft D, and back gear shaft E, the latter being positioned at the end of the driving shaft in order to economize space. The driving shaft carries on its outer end a loose pulley F having a flange $f$ inclosing a friction clutch $f'$ which is expanded to lock the pulley to the shaft by a plunger $g$ longitudinally movable in the hollow driving shaft and attached to a spool G by a pin $g'$. Said pin works in a longitudinal slot in the driving shaft. Said spool is bored tapering, as at $g^2$, on the side opposite from the pulley, and is adapted to form a brake on the tapered end $h$ of a fixed bushing H when the spool is moved in the direction to release the friction clutch. Inasmuch as the clutch itself does not constitute a part of this invention, it is unnecessary to describe its construction in detail. It will suffice to say that the expansion of said clutch to lock the pulley to the shaft is effected by the tapered end $g^3$ of the plunger $g$ entering between and forcing apart two pins $f^2$ (one of which is shown in Fig. 2) extending radially through to the interior of the shaft, when said plunger is moved outward by shifting the spool G in that direction. When the spool is moved in the opposite direction the clutch is released, leaving the pulley to revolve loose on the shaft, and said shaft is locked positively against turning by the engagement of the tapered brake surfaces $g^2$ and $h$. The mechanism for shifting said spool G is illustrated in Figs. 3 and 4. It may comprise a lever $g^4$ pivoted at $g^5$ to swing in a horizontal plane, and having one end $g^6$ bifurcated and swiveled to a shoe $g^7$ engaging the groove $g^8$ in said spool. The other end of the lever $g^4$ may be formed with a segmental rack $g^9$ which meshes with rack teeth $i$ on a slide $i'$ having other rack teeth $i^2$ meshing with a pinion $i^3$ on a vertical stud $i^4$ carrying a hand lever I.

The driving shaft B carries three cluster gears $b$, $b'$ and $b^2$ splined thereon, and also a separate loose gear $b^3$ which is suitably retained against sliding on the shaft. The gears $b$, $b'$ and $b^2$ are adapted to selectively mesh with gears $d$, $d'$ and $d^2$ on the intermediate shaft D. The gear $b^3$ is constantly in mesh with a gear $d^3$ on said intermediate shaft. The cluster gear casting $b^6$ is provided with a clutch member $b^4$ on the end facing the gear $b^3$, and the latter is equipped with a corresponding clutch member $b^5$, so that by shifting the cluster gears four different speeds may be given to the intermediate shaft, namely, through the intermeshing gears $b$ and $d$, $b'$ and $d'$, $b^2$ and $d^2$, or $b^3$ and $d^3$, the latter when the clutch members $b^4$ and $b^5$ are in engagement for turning the cluster gears with said gear $b^3$.

The shifting mechanism for the cluster gears, as illustrated in Figs. 4 and 5, may consist of a slide $k$ splined to a rod $k'$ and having a yoke $k^2$ engaging the groove $b^7$ in the cluster gear casting $b^6$, see Fig. 2. Said slide also has a horizontally extending plate $k^3$ having rack teeth $k^4$ on its under face meshing with a pinion $k^5$ on a stud $k^6$ to which is fixed a crank K. The plate $k^3$ and rack $k^4$ are made long enough to allow for the four adjustments of the cluster gears.

The gears $d$ and $d'$ are fast on a sleeve $d^4$, Figs. 2 and 11; which sleeve may be keyed to the intermediate shaft D. The gears $d^2$ and $d^3$ are on another sleeve $d^5$ also keyed to said intermediate shaft. Said sleeves $d^4$ and $d^5$ may be separated by a collar $d^6$. The gear $d$, on the sleeve $d^4$, is constantly in mesh with a gear $c$ loose on a sleeve $c'$ which is itself mounted loose around the spindle C. The sleeve $d^5$ has a third gear $d^7$ which is constantly in mesh with a gear $c^2$ also loose on the sleeve $c'$. The facing sides of the gears $c$ and $c^2$ have clutch members $c^3$ and $c^4$, respectively. Corresponding clutch members $j$ and $j'$ are carried by opposite ends of a spool J splined to the sleeve $c'$ between the gears $c$ and $c^2$. While the clutch members $c^3$, $c^4$, $j$ and $j'$, as shown, are of the positive jaw type, it will be understood that friction clutch members will answer just as well. The shifting of said spools so as to bring one of its clutch members into operative engagement with the clutch member of one of said gears $c$ or $c^2$, will cause the selected gear to turn with the sleeve $c'$. Thus two speeds may be transmitted to the sleeve $c'$ from the intermediate shaft, making eight speeds from the driving shaft to said sleeve.

The shifting mechanism for the spool J, as illustrated in Fig. 6, may consist of a shoe $b$ engaging the groove $j^2$ in said spool see Fig. 2, and carried at the free end of an arm $b'$ fast on the inner end of a stud $b^2$ having on its outer end a segmental rack $b^3$ meshing with a pinion $l^4$ on another stud $l^5$ attached to a crank L.

At one end of the sleeve $c'$, there is mounted directly on the spindle and keyed thereto a large gear M which is adapted to mesh with a small gear $e$ splined upon the hub $e'$ of a large gear $e^2$ loose on the back gear shaft E, see Fig. 2. The back gear $e^2$ is constantly in mesh with a small gear N splined on the sleeve $c'$ and preferably overlapping the hub $m$ of the gear M. Said gears M and N have supplemental clutch members $m'$ and $n'$ which may brought into operative engagement by shifting the gear N. These clutch members $m'$ and $n'$, as shown are of the positive jaw type, but friction clutch members may be used instead if preferred. It is obvious that when said clutch members are in operative engagement and the gear $e$ is out of mesh with the gear M the sleeve $c'$ will be connected directly to the spindle for the "open" drives of which there are eight as already explained. On the other hand, when the clutch members $m'$ and $n'$ are out of engagement and the gear $e$ is in mesh with the gear M, as shown in Fig. 2, the spindle is driven indirectly through the back gears as shown in Fig. 2, making eight additional speeds known as the "back gear" drives, and thus giving sixteen changes of speed altogether.

Now it is clear that in making a change from the "open" to the "back gear" drives, or vice versa, it is necessary to move the gear $e$ out of mesh with the gear M before the clutch member $n'$ is moved into engagement with the clutch member $m'$, or said clutch members must be separated before the gear $e$ is moved into mesh with the gear M. We have provided means for accomplishing these two operations in the proper order by simply turning a crank P on the front of the casing A in one direction to change from the "open" to the "back gear" drives, and in the opposite direction to effect the reverse change.

One appropriate form of this improved means as illustrated in Figs. 7, 8, 9 and 10, consists of two interrupted gears $p'$ and $p^2$ fixed on the stud $p$ of the crank P, and two shifting devices, having arms R and S, respectively, on the free ends of which are interrupted segmental racks $r$ and $s$, meshing, respectively with the interrupted gears $p'$ and $p^2$. The arm R, having the segmental rack $r$, is attached to a stud $r'$ carrying an arm $r^2$ at its other end. Said arm $r^2$ has a shoe $r^3$ engaging the groove $n^3$ in the carrier or sleeve $n^2$ of the gear N. The arm S, having the segmental rack $s$, is fixed on a stud $s'$ carrying an arm $s^2$ on which is mounted a yoke $s^3$ directly engaging the gear $e$.

The interrupted gears $p'$ and $p^2$ are placed on the stud $p$ so that when the gear $e$ is in mesh with the gear M, as illustrated in Fig. 2, said gears and the interrupted segments R and S will occupy the relative positions shown in Figs. 8, 9 and 10. It will be noted that in these views the smooth portion of the gear $p'$ is engaged with the groove $r^4$ in the segment $r$, thereby holding the arm R stationary and in position to keep the clutch member $n'$ away from the clutch member $m'$, while the teeth of the interrupted gear $p^2$ are in mesh with the teeth of the segment $s$, so as to hold the gear $e$ in mesh with the gear M. Now if the stud $p$ carrying the interrupted gears $p'$ and $p^2$, is turned by moving the crank P in one direction or clockwise in the present instance, the teeth of the gear $p^2$ will travel in the teeth of the segment $s$ causing the arm S to swing, the stud $s'$ to turn, and the arm $s^2$ to swing, thereby moving the gear $e$ out of mesh with the gear M. By the time this is accomplished, the smooth portion of said gear $p^2$ will have reached the groove $s^4$ in the segment $s$, so that a continued rotary movement of said gear in the same direction will not affect the arm S. During this rotation of the gear $p^2$, the gear $p'$ has also been turning, its smooth portion simply slipping around in the groove $r^4$ without effecting any movement of the arm R. When the smooth portion of the gear $p^2$ has reached the groove $s^4$ in the segment $s$, however, the teeth of the gear $p'$ will have reached the teeth of the segment $r$ so that further rotary movement of said gear in the same direction will swing the arm R causing the stud $r'$ to turn and the arm $r^2$ to swing, thereby shifting the gear sleeve or carrier $n^2$ until the clutch member $n'$ carried thereby engages the clutch member $m'$ on the gear M. The result of this operation, that is, the turning of the crank P clockwise, is therefore to change from a "back gear" drive as shown in Fig. 2, to an "open" drive. A reverse or counter-clockwise movement of said crank will, of course, bring about the operations just described in the inverse order and shift back again from the "open" drive to the "back gear" drive, the gear sleeve or carrier $n^2$ being first moved to completely disengage the clutch member $n'$ from the clutch member $m'$ and the gear $e$ then moved into mesh with the gear M.

By referring to Figs. 1, 2, 4, 5, 6 and 7 and tracing the operations of the levers P, L and K thereon, it will be observed that movement of any one of said levers in one direction will have the effect of increasing the speed of the spindle, whereas a movement of any one of said levers in the opposite direction will have the opposite effect, that is, reduce the speed of the spindle. This fact is of great importance and convenience, inasmuch as the operator can always rely upon the same rule in moving any of the levers, instead of having to remember perhaps that each lever works differently from the next.

Having thus described our invention, what we claim as new and desire to secure by Letters Patent of the United States is:

1. The combination, with a spindle, of a sleeve loose thereon, means to turn the sleeve, a gear splined on the sleeve and having a clutch member, a gear fast on the spindle and having a supplemental clutch member, a back gear meshing with the gear on the sleeve, another back gear mounted to turn with the first back gear and meshing with the gear on the spindle, and means for first moving the second back gear out of mesh with the gear on the spindle and then sliding the gear on the sleeve to bring its clutch member into operative engagement with the clutch member on the spindle, and vice versa.

2. The combination with a spindle, of a sleeve loose thereon, means to turn the sleeve, direct and indirect drives from the sleeve to the spindle, means for shifting each of said drives into and out of operative position, interrupted segments carried by said shifting means, interrupted gears meshing with said segments, and means for turning said gears, whereby one drive is thrown out and the other thrown in.

3. The combination with a spindle, of a sleeve loose thereon, means to turn the sleeve, direct and indirect drives from the sleeve to the spindle, means for shifting each of said drives into and out of operative position, interrupted segments carried by said shifting means, interrupted gears meshing with said segments, a stud carrying said gears, and means for turning said stud, whereby one drive is thrown out and the other in by turning said stud in one direction or the other.

4. The combination with a spindle, of a sleeve loose thereon, means to turn the sleeve, direct and indirect drives from the sleeve to the spindle, shifting devices for each of said drives, interrupted segments carried by said shifting devices, each segment having a series of teeth and a groove, interrupted gears meshing with said segments, each gear having a series of teeth and a smooth portion, the latter adapted to engage the groove in its segment to allow for lost motion during a part of the turning of each gear, and means to turn said gears together, whereby the lost motion on each segment occurs during the movement of the other segment for first throwing out one drive and then throwing in the other.

5. The combination with a spindle, of a sleeve loose thereon, means to turn the sleeve, direct and indirect drives from the sleeve to the spindle, shifting devices for each of said drives, interrupted segments carried by said shifting devices, each segment having a series of teeth and a groove, interrupted gears meshing with said segments, each gear having a series of teeth and a smooth portion, the latter adapted to engage the groove in its segment to allow for lost motion during a part of the turning of each gear, a stud carrying said gears, and means for turning said stud, the gears being fixed to the stud with their smooth portions arranged in relative positions which cause the lost motion on each segment to occur during the movement of the other segment, whereby one drive is thrown out before the other is thrown in.

6. The combination with a spindle, of a sleeve loose thereon, means to turn the sleeve, a gear splined on the sleeve and having a clutch member a gear fast on the spindle, and having a supplemental clutch member, a back gear meshing with the gear on the sleeve, another back gear mounted to turn with the first back gear and meshing with the gear on the spindle, shifting devices for said clutch carrying gear on the sleeve and for said second back gear, said shifting devices including interrupted segments the swinging of which will effect the shifting operations, interrupted gears meshing with said segments, and means for turning both gears at the same time, said gears being arranged in such relative positions that motion is lost on one segment while the other segment is being swung, whereby one shifting device is completely actuated before the other is started.

7. In a machine of the character described, the combination of a spindle, a sleeve loosely mounted thereon, means to turn the sleeve, direct and indirect drives from the sleeve to the spindle, means for shifting said drives into and out of operative position, said means including two sets of toothed members and gears, the toothed member and gear of one set being inoperative while the toothed member and gear of the other set are operative, and unitary means for moving the two sets of toothed members and gears.

8. In a machine of the character described, the combination of a spindle, a sleeve loosely mounted thereon, means for turning the sleeve, direct and indirect drives from the sleeve to the spindle, means for shifting said drives alternatively into and out of operative position, said means including toothed members and lever connections, and a single hand operated device for moving said toothed members and lever connections to effect operative connection between one of said drives and the spindle only after the operative connection between the other drive and spindle has been interrupted.

9. The combination with a driving shaft, of a spindle, a sleeve on said spindle, an intermediate shaft, means for driving said sleeve at different speeds through the intermediate shaft, another shaft arranged in line with the driving shaft, and means for driving the spindle from the sleeve through said last mentioned shaft.

10. The combination with a driving shaft, of cluster gears splined thereon and having a clutch member, a separate gear loose on said driving shaft and having a supplemental clutch member, a second shaft, gears thereon adapted to selectively mesh with the cluster gears on the driving shaft, another gear on said second shaft constantly in mesh with the loose gear on the driving shaft, and means for shifting said cluster gears for bringing them into mesh with the corresponding gears on the second shaft or for bringing the clutch member on the cluster gears into operative engagement with the clutch member on the loose gear.

11. The combination with a driving shaft, of cluster gears, splined thereon, a driven shaft having gears adapted to selectively mesh with said cluster gears, a slide movable in a line parallel to the axis of the driving shaft, said slide having means to operatively engage the cluster gears, and a rack, an actuating stud arranged transversely of the slide, and a pinion on the stud in mesh with the rack on the slide, for shifting said cluster gears.

In testimony whereof we have signed our names to this specification in the presence of two attesting witnesses.

RICHARD K. LE BLOND.
WM. F. GROENE.

Witnesses:
GRACE A. PUGH,
IRA INGERSOLL.